(12) United States Patent
Kodama et al.

(10) Patent No.: US 7,188,157 B1
(45) Date of Patent: Mar. 6, 2007

(54) CONTINUOUS UPDATE OF DATA IN A DATA SERVER SYSTEM

(75) Inventors: Shoji Kodama, San Jose, CA (US); Akira Yamamoto, Cupertino, CA (US); Kenji Yamagami, Los Gatos, CA (US); Masayuki Yamamoto, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 746 days.

(21) Appl. No.: 09/606,403

(22) Filed: Jun. 30, 2000

(51) Int. Cl.
*G06F 15/177* (2006.01)
*G06F 15/167* (2006.01)
*G06F 15/16* (2006.01)

(52) U.S. Cl. .................. 709/220; 709/212; 709/217; 709/218; 709/221; 709/223

(58) Field of Classification Search ............ 709/202, 709/203, 208, 211–219, 221, 223, 220; 717/171
See application file for complete search history.

(56) References Cited

U.S. PATENT DOCUMENTS

| | | | |
|---|---|---|---|
| 4,802,164 A | 1/1989 | Fukuoka et al. | |
| 4,837,680 A | 6/1989 | Crockett et al. | |
| 5,155,845 A | 10/1992 | Beal et al. | |
| 5,680,574 A | 10/1997 | Yamamoto et al. | |
| 5,774,660 A | 6/1998 | Brendel et al. | |
| 5,781,908 A | 7/1998 | Williams et al. | |
| 5,841,980 A * | 11/1998 | Waters et al. ............... 709/204 |
| 5,867,706 A | 2/1999 | Martin et al. ............... 395/675 |
| 5,878,218 A | 3/1999 | Maddalozzo et al. | |
| 5,890,156 A | 3/1999 | Rekieta et al. | |
| 5,917,998 A | 6/1999 | Cabrera et al. | |
| 5,920,725 A * | 7/1999 | Ma et al. .................... 717/171 |
| 5,950,203 A | 9/1999 | Stakuis et al. ............... 707/10 |
| 6,003,045 A | 12/1999 | Freitas et al. | |
| 6,006,264 A | 12/1999 | Colby et al. ................ 709/226 |
| 6,052,718 A | 4/2000 | Gifford | |
| 6,061,685 A | 5/2000 | Fantenberg | |
| 6,061,761 A | 5/2000 | Bachmat | |
| 6,088,330 A | 7/2000 | Bruck et al. | |
| 6,088,766 A | 7/2000 | Bachmat et al. | |
| 6,092,213 A | 7/2000 | Lennie et al. | |
| 6,189,071 B1 | 2/2001 | Bachmat | |
| 6,230,190 B1 | 5/2001 | Edmonds et al. | |

(Continued)

OTHER PUBLICATIONS

Microsoft Computer Dictionary, 5th Edition p. 437.*

*Primary Examiner*—Abdullahi Salad
*Assistant Examiner*—Hussein El-chanti
(74) *Attorney, Agent, or Firm*—Townsend and Townsend and Crew LLP

(57) ABSTRACT

A continuous update method includes reading out data from a first data store via a data switch to satisfy client requests for data. A second data store is updated via the data switch to contain new updated information. When it is desired to satisfy client requests with the new data, the second data store is copied to a third data store and subsequent client requests are satisfied from the third data store. Further updates are made to the second data store. The process is repeated, but the roles of the third and first data stores are reversed. In another embodiment of the invention, subsequent client requests are satisfied from the second data store and further updates are made to the first data store.

16 Claims, 13 Drawing Sheets

U.S. PATENT DOCUMENTS

| | | |
|---|---|---|
| 6,237,063 B1 | 5/2001 | Bachmat et al. |
| 6,282,671 B1 * | 8/2001 | Islam et al. ............. 714/6 |
| 6,314,458 B1 * | 11/2001 | Steele et al. ............. 709/219 |
| 6,324,580 B1 * | 11/2001 | Jindal et al. ............. 709/228 |
| 6,324,692 B1 * | 11/2001 | Fiske ............. 717/171 |
| 6,397,292 B1 | 5/2002 | Venkatesh et al. |
| 6,408,369 B1 | 6/2002 | Garrett et al. |
| 6,487,634 B1 | 11/2002 | Bachmat |
| 6,502,205 B1 * | 12/2002 | Yanai et al. ............. 714/7 |
| 6,516,350 B1 | 2/2003 | Lumelsky et al. |
| 6,542,962 B2 * | 4/2003 | Kodama et al. ............. 711/114 |
| 6,601,101 B1 | 7/2003 | Lee et al. |
| 6,606,643 B1 | 8/2003 | Emens et al. |
| 6,633,538 B1 * | 10/2003 | Tanaka et al. ............. 370/222 |
| 6,654,752 B2 * | 11/2003 | Ofek ............. 707/10 |
| 6,662,268 B1 * | 12/2003 | McBrearty et al. ............. 711/114 |
| 6,694,406 B2 | 2/2004 | Kodama et al. |
| 6,799,245 B1 | 9/2004 | Kochiya |
| 6,826,613 B1 | 11/2004 | Wang et al. |
| 6,912,668 B1 * | 6/2005 | Brown et al. ............. 714/6 |
| 6,922,724 B1 | 7/2005 | Freeman et al. |

* cited by examiner

CONTINUOUS UPDATE OF DATA IN A DATA SERVER SYSTEM

BACKGROUND OF THE INVENTION

The present invention relates generally to client-server systems and more particularly to clustered data content servers in a network.

In a clustered data server environment, each server stores its contents in a local disk drive. For example, a data server may be a web server, a document server, an image server, a video server, and so on. Each local disk drive is a mirror of an original (or master) disk drive. An authoring server creates and updates web contents in the master disk. New content or updated content are transferred from the authoring server to each web server via a network. If the number of such transfers is too high and/or the size of the data being transferred is too large, it will take a long time to transfer the data. This increases the CPU load of the receiving web server, so that the web server cannot handle incoming HTTP requests while its contents are being updated. For this reason, content update from the authoring server typically cannot occur during the daytime. The problem is exacerbated because Internet traffic is worldwide and it is always "daytime" somewhere in the world.

On the other hand, if a shared file system is implemented, other problems occur. In a shared file system, all of the web servers share a disk drive (more typically a system of disk drives) and a file server manages the meta-data of a file system. However, the file server of this shared file system then becomes the bottleneck, both in terms of reliability and performance. No web server can read the contents from the shared disk drive without the file server and all web servers must communicate with the file server every time there is an attempt to open a file. Consequently, this results in a large latency period which is usually not tolerated by the end-user for any length of time.

There is a need for a solution that can allow real-time updating of a data server's contents. It is desirable to be able to provide this capability especially when the data server is handling client requests. It is desirable to provide real-time content updating without degrading system performance.

SUMMARY OF THE INVENTION

A method and system for continuous update of data in a data server which does not affect service to clients includes satisfying client requests for data by reading from a first data store. At the same time, a second data store which is identical with the first data store at system boot up is updated. At some time, when it is desired to copy the new contents in the second data store to the first data store, data from the second data store is copied to a third data store. Also, subsequent client requests for data are satisfied by reading from the third data store. Also, another round of creation/update activity begins on the second data store.

One aspect of the invention includes transferring the data to through a data switch, but performing the copy operation exclusive of the data switch. Another aspect of the invention includes determining whether read operations from the third data store to satisfy client requests for data in fact need to be read operations from the second data store. In still another aspect of the invention includes determining whether write operations to the second data store during the next round of creation/updates must be preceded with a write operation from the second data store to the third data store.

In another embodiment of the invention, client requests for data are satisfied by reading from a first data store. Concurrently, creation/update activity occurs on a second data store. When an update is desired, subsequent client requests for data are satisfied by reading from the second data store. The next round of creation/update activity is then performed by reading and writing the first data store. One aspect of this embodiment of the invention is that prior to reading and writing the first data store, there is a wait until all pending client-initiated read operations from the first data store have completed. When all such pending client-initiated read operations have completed, a copy operation is initiated to copy the contents of the second data store to the first data store. Another aspect of the invention is that the transfer of data is achieved through a data switch, except that the copy operation occurs exclusive of the data switch.

BRIEF DESCRIPTION OF THE DRAWINGS

The teachings of the present invention can be readily understood by considering the accompanying detailed description in conjunction with the following drawings.

DESCRIPTION OF THE SPECIFIC EMBODIMENTS

Figure 1:
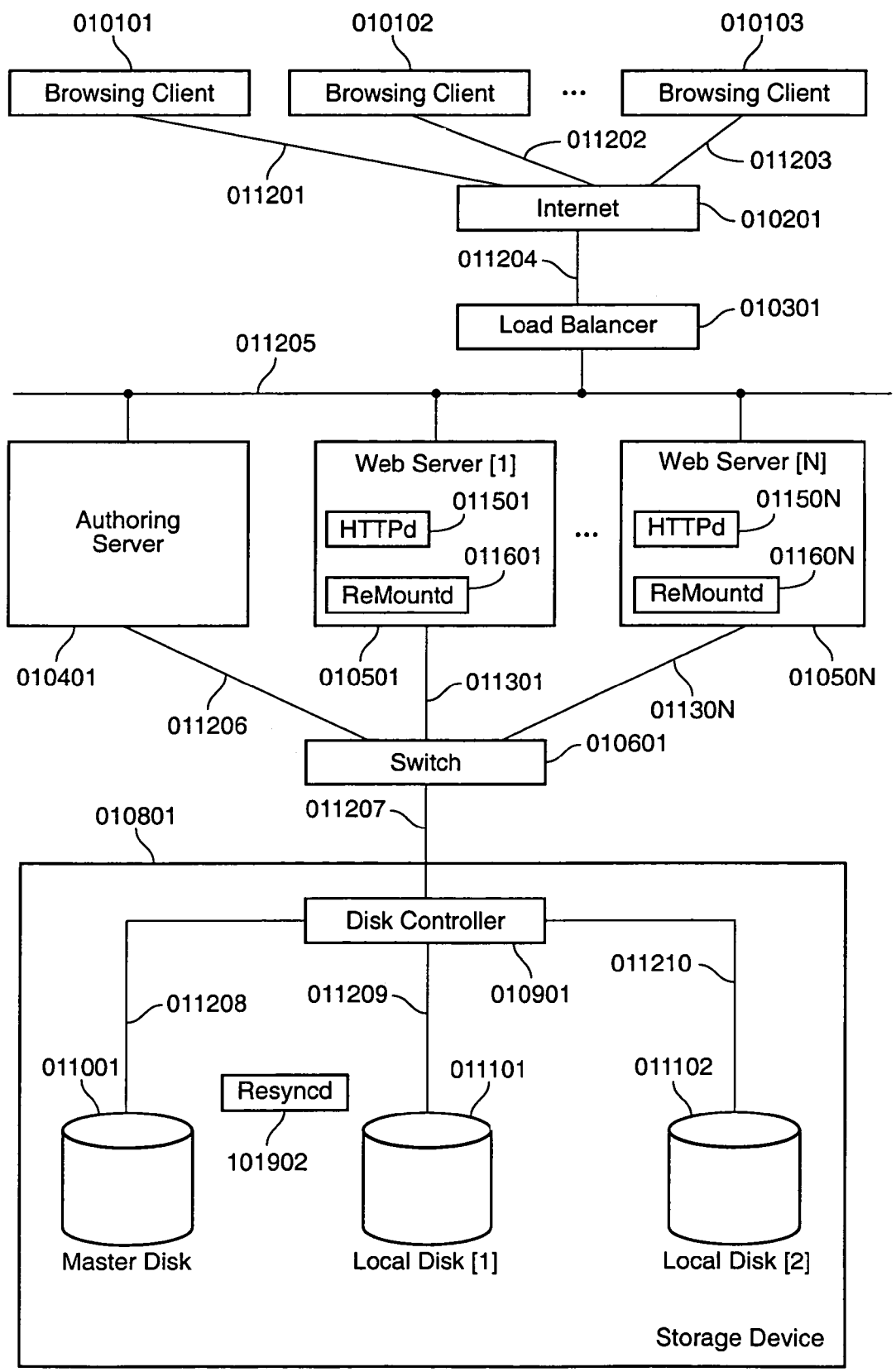
FIG. 1 is a schematic representation of one embodiment of a data server arrangement in accordance with the invention.

FIG. 1 shows an embodiment of a data server system in accordance with the present invention. One application of a data server is in a Web Server machine as shown in the figure. It is noted that the Web Server machine is merely exemplary and simply serves as a vehicle for discussing the best mode for practicing the invention at the time of filing of this application. It is understood that the invention is readily adapted to any data server system; for example, a data server may be a Web Server machine, a document server, an image server, a video server, and so on.

As shown in FIG. 1, the World Wide Web (WWW, also the Web) Server environment includes one or more clients 010101, 010102, . . . 010103, each having web browsing software. These clients send requests to one or more Web Server machines to obtain contents, for example HTML data, image data, audio data and so on. The web browsing software then displays the received contents on their browsers.

Each client gains access to the web by way of the Internet 010201. This is typically accessed by way of a public switched network, namely, the telephone system. Alternatively, cable television operators provide high-speed access via cable modem service, which uses the high data capacity of the television cable network to carry Internet traffic. Clients 010101, 010102, . . . 010103 have connections 011201, 011202, . . . 011203 to the Internet via telephone connections, cable connections, wireless links and so on.

At the Web Server machine site, a load balancer 010301 receives requests from the clients. A "web server" typically comprises multiple Web Server machines in order to provide acceptable response time to the client. The load balancer selects one of the multiple Web Server machines and forwards a received request for processing by the selected Web Server machine. By so doing, the load balancer can distribute the CPU load more uniformly amongst the Web Server machines.

A Web Server machine site also includes an Authoring Server 010401. This component creates and updates the contents that the web site provides. As mentioned above, the web site typically comprises multiple Web Server machines 010501, . . . 01050N. Typically, these machines are UNIX-based or UNIX-derived systems for the reason that such systems are time-tested, robust, and capable of providing the throughput required of a server system. Other systems, for example, Windows NT are also contemplated.

Each Web Server machine typically comprises two components. A first component is an HTTP (hypertext transport protocol) daemon 011501, . . . 01150N. The HTTP daemon is a process which runs on a Web Server machine and processes client requests for the web site's content. First, an HTTP daemon receives a request from a browsing client. Next, the HTTP daemon interprets what content the client is requesting. Third, the HTTP daemon accesses and reads the content from a data store. Finally, the HTTP daemon sends the accessed content to the requesting client via the Internet, thereby satisfying the client request for data.

A second component is of each Web Server machine is a remount daemon 011601, . . . 01160N. Each remount daemon communicates with the Authoring Server. The role of this component is described later.

Each Web Server machine 010501, . . . 01050N can mount data stores 011101, 011102 via its local file system. Consequently, each Web Server machine can access data from a data store directly without any communication overhead, as would be incurred for example, in a shared file system using a file server.

A high speed data switch 010601 is used to connect the Web Server machines 010501, . . . 01050N and the Authoring Server 010401 to the data storage system 010801. In a preferred embodiment, the data switch is based on the Fibre Channel standard defined by the American National Standards Institute (ANSI). For example, Brocade Communications Systems, Inc. (web site: "http://www.brocade.com") manufactures and sells the SilkWorm® brand data switch (models 2010, 2040, 2050, 2100, 2400, and 2800) which are based on the Fibre Channel standard. It is understood that the present invention is not limited by the used of Fibre Channel switches. Other data switching technologies can be used; for example, gigabit Ethernet data switches and ATM switching are possible. However, the Fibre Channel technology is preferred because the standard was defined with high-speed, robust data switching applications in mind.

A Storage Device 010801 comprises several disk drives including a Master Disk 011001 and two Local Disks 011101, 011102. Each Web Server machine 010501, . . . 01050N can mount either of the Local Disks onto its file system, and by so doing each server can share the same disk. In traditional WWW environment, each Web Server machine has its own local disk and the Authoring Server has also its own local disk. Hence, when updating a Web Server machine's contents in the local disks, the Authoring Server must send new or updated contents to all Web Server machines via a file server over a network, for example Ethernet. This approach incurs CPU overhead from each Web Server machine which consequently degrades system performance. For this reason, updates cannot occur at any time, but only during certain periods of the day.

Storage Device 010801 further includes a disk controller 010901 which manages the disk drives. The disk controller processes I/O requests from the servers. Each server is coupled to the disk controller via the data switch 010601 so that each server appears to have sole access to the disk controller.

The storage device includes a master disk 011001. The Authoring Server creates new content and updates existing content contained in the master disk. Every now and again, the contents of the master disk are copied to the local disk; for example, depending on a schedule, or as determined by a system administrator, and so on.

The Local Disks 011101,011102, identified as Local Disk [1] and Local Disk[2] are mounted to the file system of each Web Server machine. In accordance with the invention only one of the two local disks is mounted to all of the Web Server machines at any one time.

The storage device further includes a Resync Daemon 010902. This component makes a snapshot of a disk. In accordance with the invention, the Resync daemon copies updated data from the Master Disk to one of the Local Disks.

FIG. 1 also shows the interconnection of the aforementioned components. Several networks exist among the above components. For example, Browsing Clients 010101 . . . 010103 connect to the Internet via communication lines 011201 . . . 011203. Load Balancer 010301 connects to the Internet via a high speed link 011204, such as a fibre optics line, a cable modem connection, a DSL line and so on. The Load Balancer also connects to Web Server machines and Authoring Server via an Ethernet connection 011205. Each server connects to the Storage Device 010801 via Fibre Channel 011206, 011301, . . . , 01130N, 011207 through data switch 010601. In the Storage Device, Disk Controller 010901 connects to disk drives via SCSI 011208, 011209, 011210.

Figure 12:
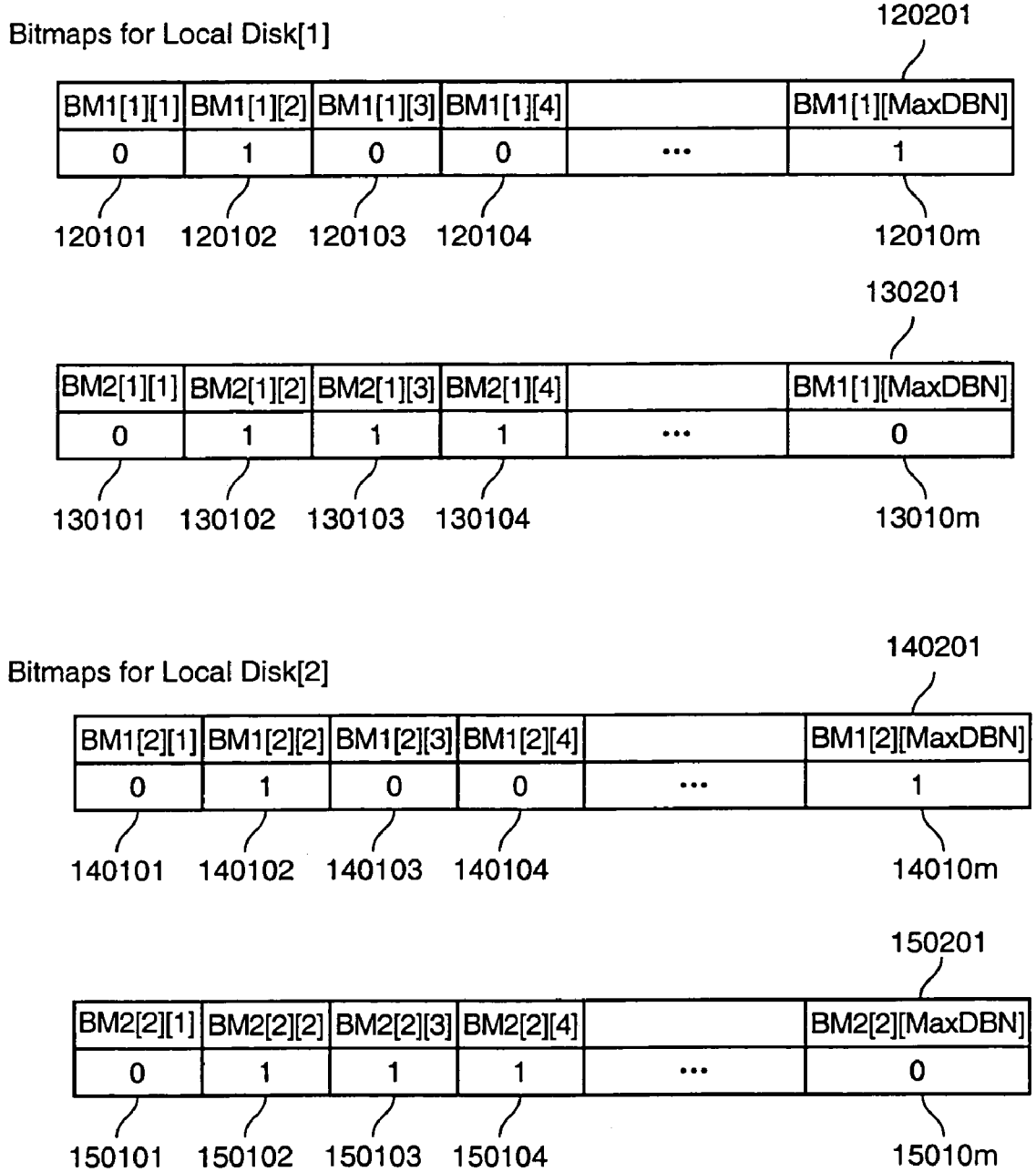
Figures 13, 14:
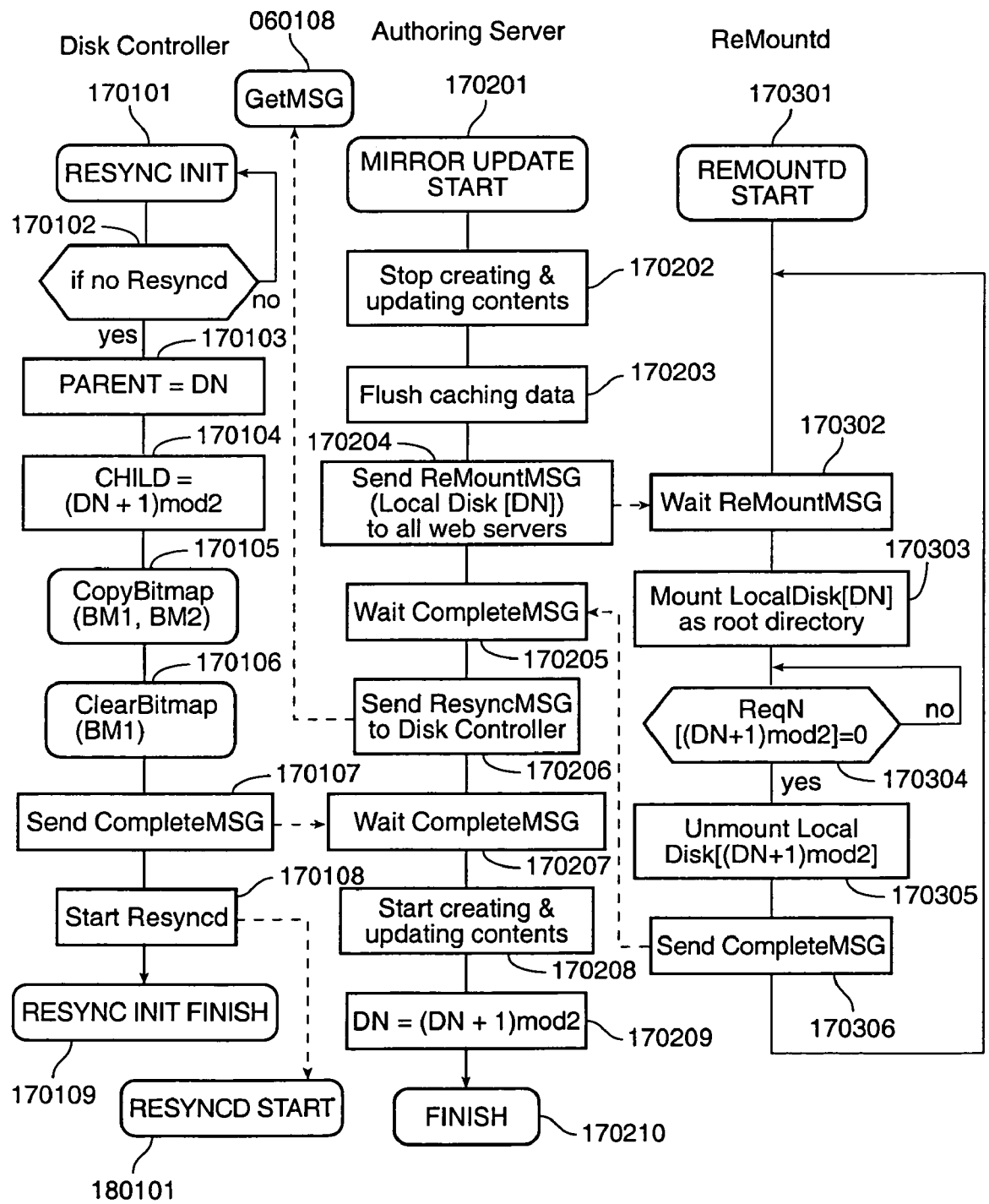
FIG. 14 is a high level flowchart outlining the main processing steps during an update procedure in accordance with another embodiment of the invention.

Referring for a moment to FIGS. 10–13, various internal data variables are maintained by the foregoing components. The Authoring Server 010401 manages Unmounted Disk Number, DN 160101 (FIG. 13). This data variable indicates that Local Disk[DN] is not mounted by any Web Server machine.

Figures 9, 10, 11:
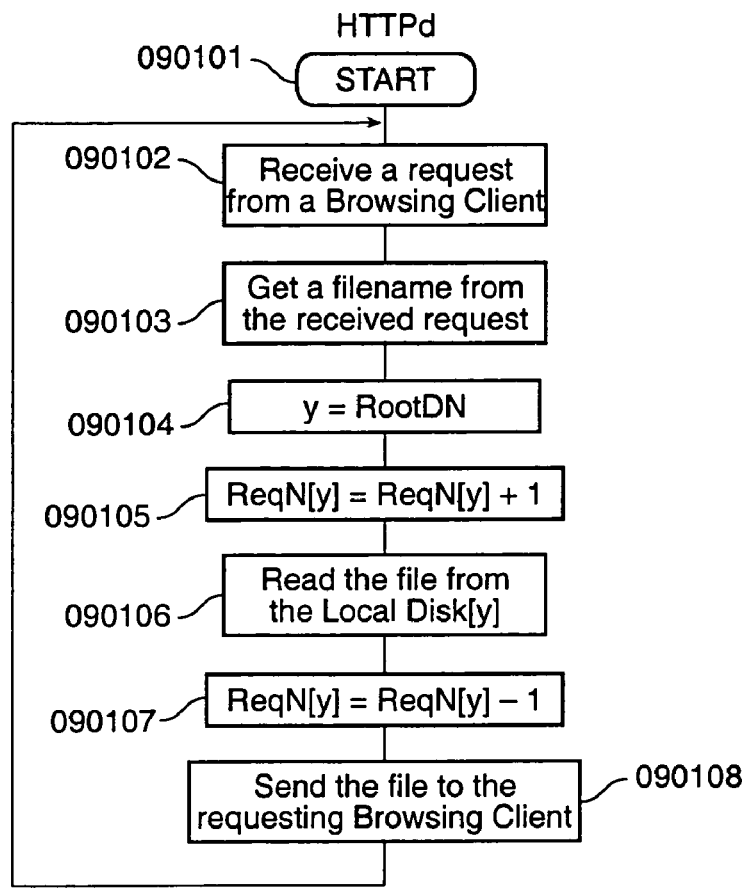
FIG. 9 outlines the main processing steps of the HTTP daemon process.
FIGS. 10–13 illustrate the data structures used in accordance with one embodiment of the invention.

Each Web Server machine 010501, . . . 01050N manages the disk number of its root directory, RootDN 110101 (FIG. 11). This variable indicates that each Web Server machine is reading contents from Local Disk[RootDN]. Each Web Server machine also manages the number of uncompleted requests for each Local Disks. For example, ReqN[1] 100101 (FIG. 10) managed by the Web Server machine 010501 indicates the number of uncompleted requests for Local Disk[1], where the requests are issued by the Web Server. A Web Server machine can unmount Local Disk[i], if and only if his ReqN[i] is zero.

Storage Device 010801 manages a set of bitmaps, BM1[1][x], BM2[1][x], BM1[2][x] and BM2[2][x] (120201, 130201, 140201, 150201, FIG. 12). These bitmaps are used for mirroring between two disk drives, namely, the Master Disk and either Local Disk[1] or Local Disk[2]. MaxDBN is the maximum number of disk blocks of a Local Disk. In this invention, all disk drives have the same number of disk blocks.

The BM1 bitmaps indicate whether the Master Disk has new information that has not yet been copied to a local disk, which by convention is defined to be a bit value of "1". Hence, if BM1[DN][x] is a "1", this indicates that block x of the Master Disk contains new information (or is being written with new information) and that block x of Local Disk [DN] will eventually have to be updated to contain the new information, namely, when the Authoring Server requests that an update operation be made (DN being a "1" or a "2" in this embodiment of the invention).

The BM2 bitmaps indicate whether the Master Disk has already been copied to the Local Disk during an update process, which by design is defined to be a bit value of "0". Hence, if BM2[DN][y] is a "0", this indicates that block y of the Master Disk has been copied to block y of Local Disk [DN]. A discussion of the operation of the invention will explain how these bitmaps are used.

Figure 2:
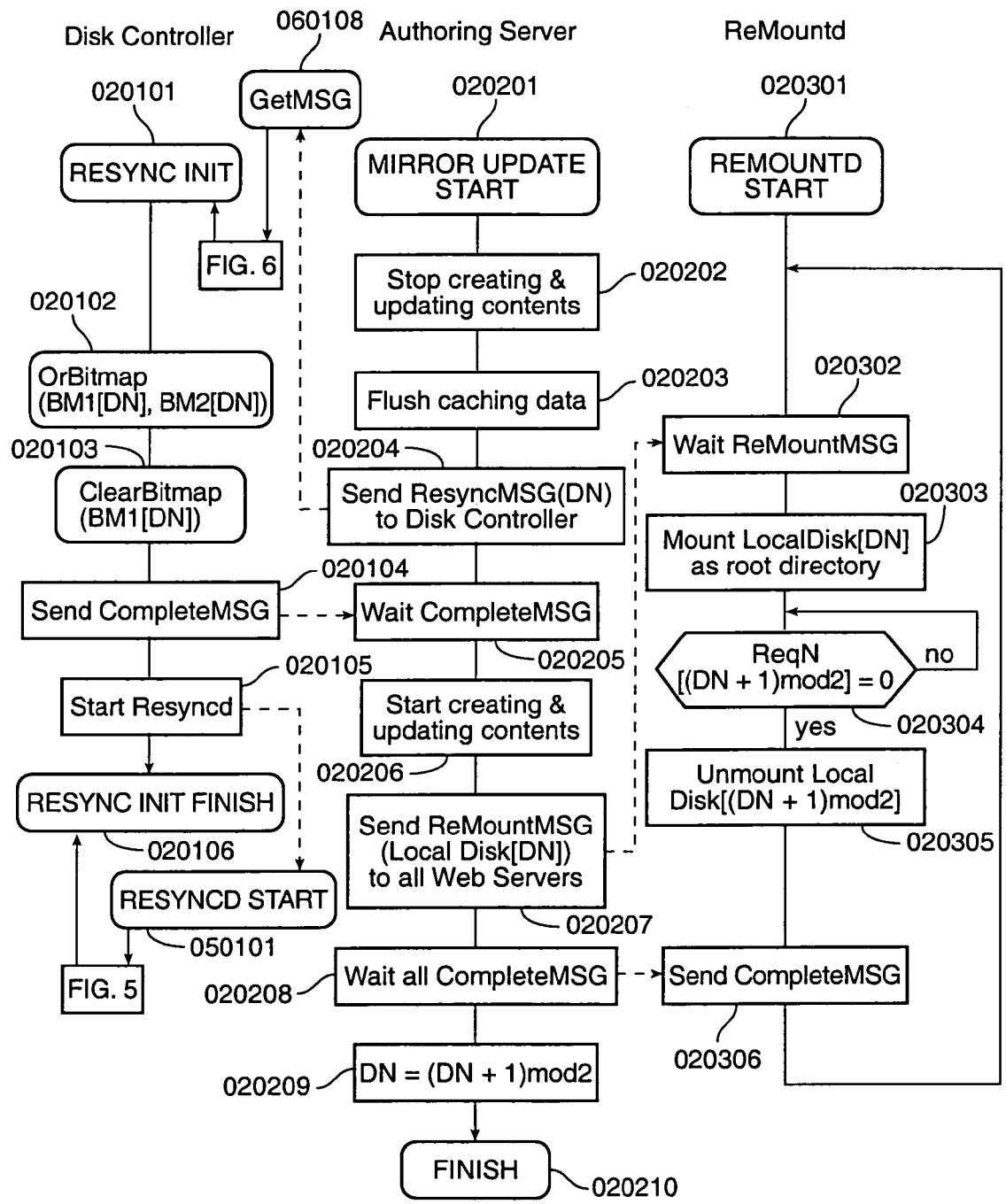
FIG. 2 is a high level flowchart outlining the main processing steps during an update procedure in accordance with one embodiment of the invention.
Figure 3:
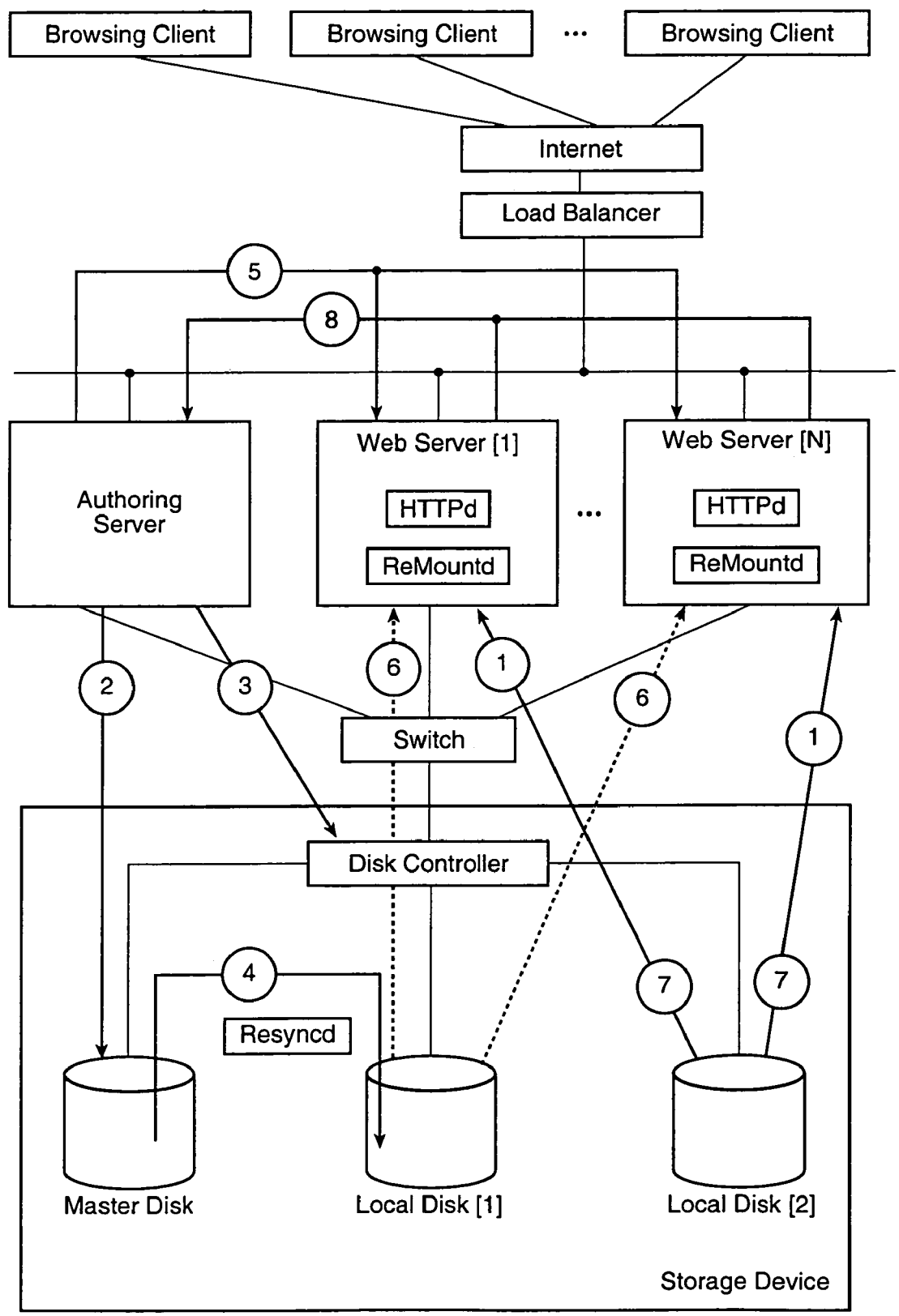
FIG. 3 illustrates the logical data flows before and during an update procedure in accordance with one embodiment of the invention.

Turn now to FIGS. 2, 3 and 5–9 for a discussion of the update operation in accordance with one embodiment of the invention. At system boot up, the contents of all the disks in Storage Device 010801 are synchronized; that is, the Master Disk and the two Local Disks contain the same information. Preferably, the disks are mirror images of one another. At system boot up, each Web Server machine mounts Local Disk[2] to some directory. The value of RootDN is 2, so each of the Web Server machines reads contents from Local Disk[2]. Each Web Server machine also initializes ReqN[1] to 0 and ReqN[2] to 0. Each Web Server machine starts its own HTTP daemon (FIG. 9) and its own ReMount daemon (Step 020301, FIG. 2). The Authoring Server initializes DN to 1, meaning that Local Disk[1] is not mounted by any of the Web Server machines. FIG. 3 shows the interaction of the system components during this process.

Figure 6:
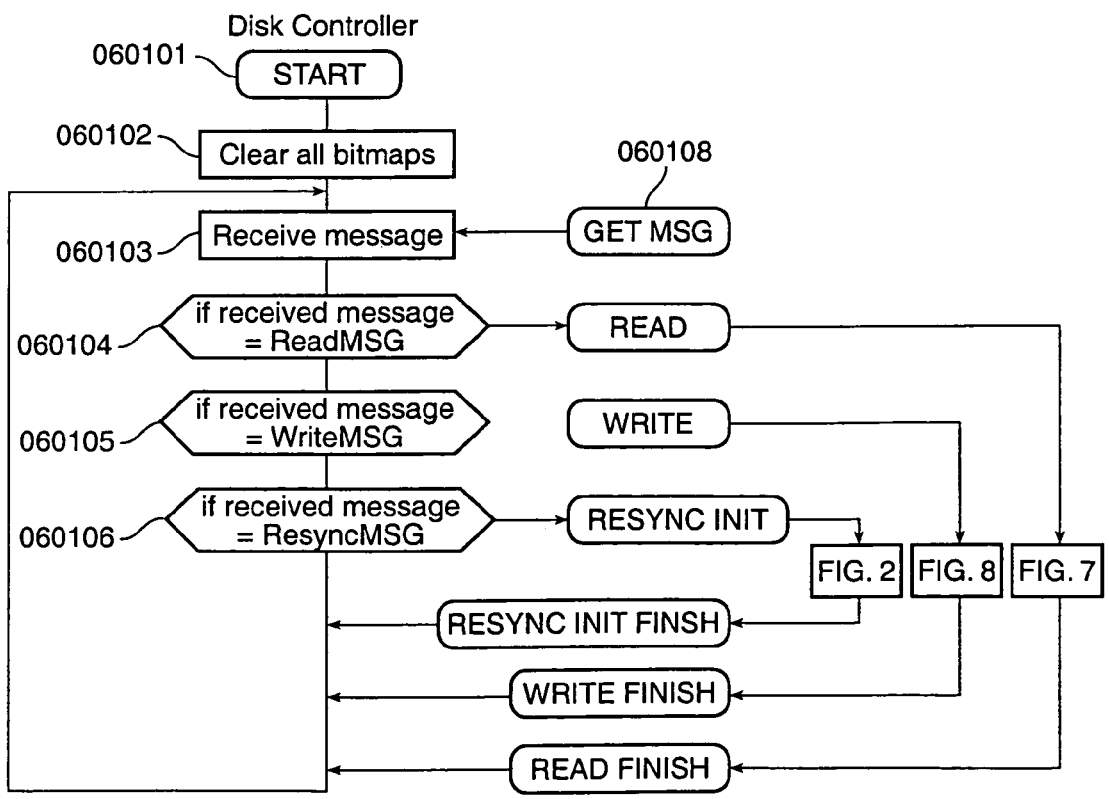
FIG. 6 outlines the main processing steps of the Disk Controller.

With reference to FIG. 6, at system boot up the Disk Controller 010901 begins to work:

Step 060102—The Disk Controller initializes all bitmaps. Thus, for all x and y, BM1[x][y]=BM2[x][y]=0.

Step 060103—The Disk Controller waits for a message from one of the Web Server machines. Upon receiving a message, the Disk Controller proceeds to Step 060104.

Figure 7:
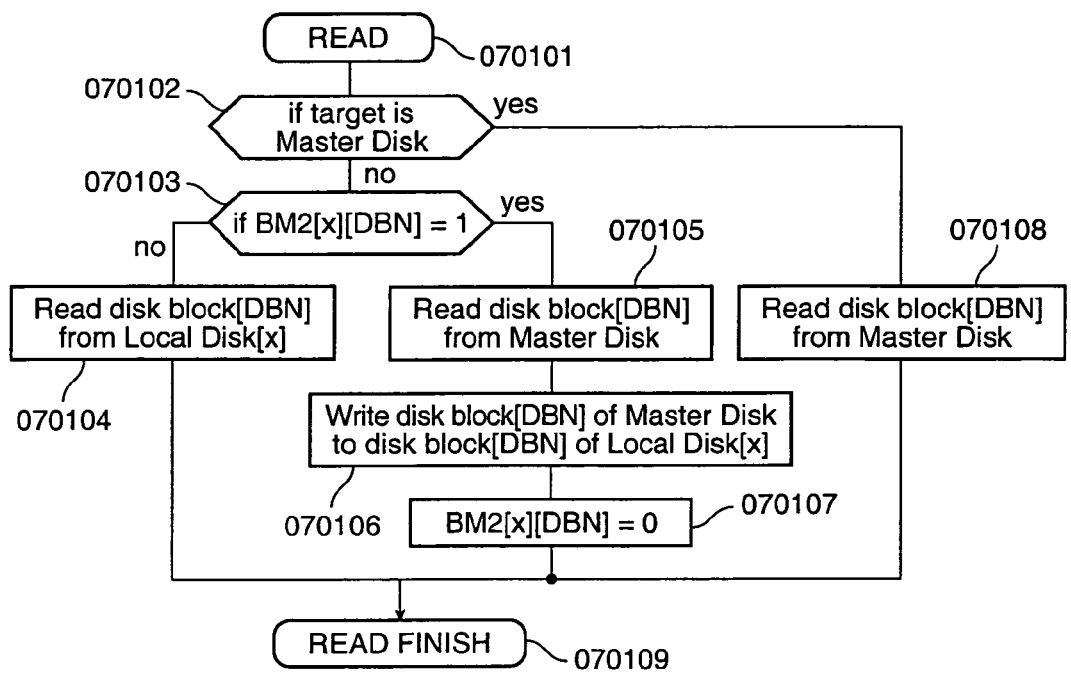
FIG. 7 outlines the main processing steps of the Read procedure in accordance with one embodiment of the invention.

Step 060104—If the received message is ReadMSG, the Disk Controller proceeds to a READ procedure (FIG. 7). In one embodiment of the invention, for example, the ReadMSG is a SCSI-standard Read command.

Figure 8:
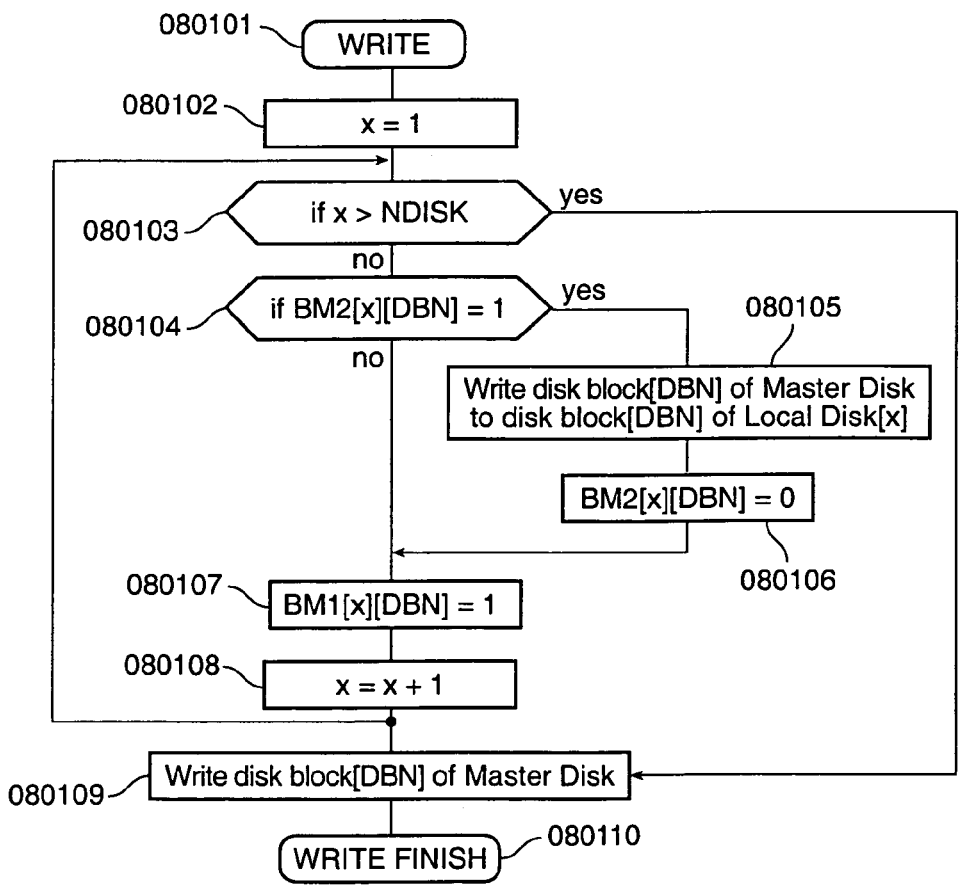
FIG. 8 outlines the main processing steps of the Write procedure in accordance with one embodiment of the invention.

Step 060105—If the received message is WriteMSG, the Disk Controller proceeds to a WRITE procedure (FIG. 8). In one embodiment of the invention, for example, the WriteMSG is a SCSI-standard Write command.

Figure 5:
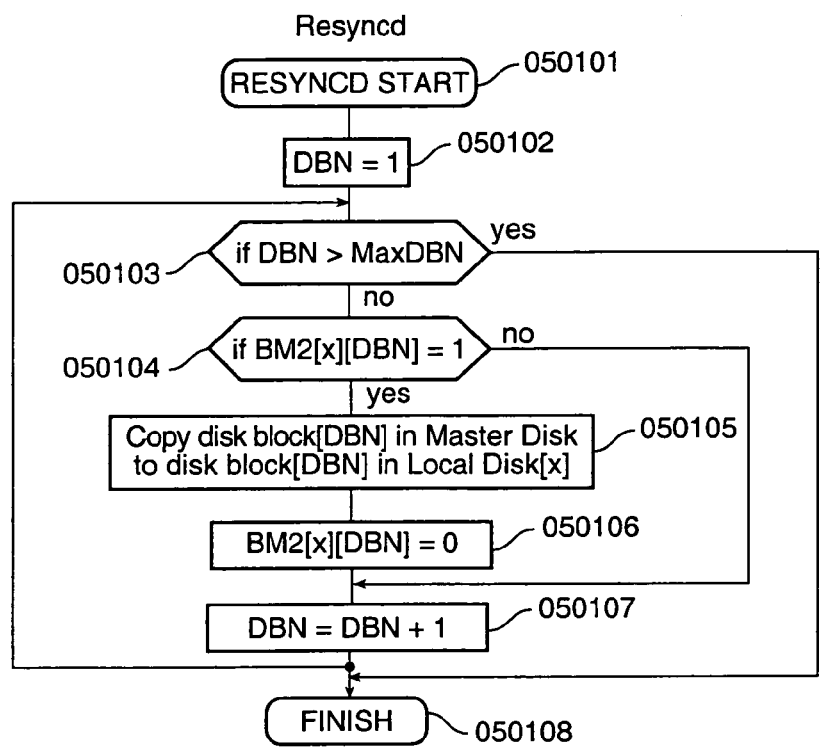
FIG. 5 outlines the main processing step of the Resync daemon process in accordance with one embodiment of the invention.

Step 060106—If the received message is ResyncMSG, the Disk Controller proceeds to a RESYNC INIT procedure (FIG. 5).

The Disk Controller continuously repeats these steps.

Referring to FIGS. 3 and 9, each HTTP daemon processes requests from Browsing Clients 01010, 010102, . . . 010103. FIG. 3 illustrates this data flow schematically with the line labeled by circle-1. The general flow of an HTTP daemon (HTTPd) follows:

Step 090102—HTTPd receives a request from the Browsing Clients.

Step 090103—HTTPd gets a file name from the received request. For example, if a requested URL is http://www.foo.com/index.html, then HTTPd extracts the file name "index.html" from the URL.

Step 090104—A temporary variable y stores the value of RootDN.

Step 090105—HTTPd increments the value of ReqN[y] by one to indicate that there is one more pending access to Local Disk[y], namely, reading the file "index.html" from Local Disk[y]. This step is an atomic process. This means that no other process can access ReqN[y] during this step.

Step 090106—HTTPd reads the contents of requested file from Local Disk[y] and sends some or all of the file to the requesting client. Each Web Server's file system can cache the files in his memory. If the requested files have already been cached, HTTPd reads the files from the cache memory. The cached files are invalidated or flushed if the directory storing the files is unmounted.

Step 090107—HTTPd decrements the value of ReqN[y] by one to indicate that there is now one less outstanding request to Local Disk[y]. This step is also an atomic process. Note that this step is not executed until step 090106 completes.

The HTTP daemon repeats these steps for each client request for data that is received by the system. It is noted that each Web Sever machine can run more than one HTTP daemon on its system. It is further noted that as the Web Server machines are satisfying client requests by accessing the requested files and sending the contents to the client, the Authoring Server can be making updates/additions to the contents of the Master Disk.

Referring to FIG. 2, at system boot up the ReMount daemon in each Web Server machine begins and enters a wait state 020302. In the wait state, the ReMount daemon waits for a ReMount-MSG to be sent by the Authoring Server 010401.

Referring now to FIGS. 2 and 3, as noted above during the normal course of system operation, the Authoring Sever creates and/or updates the contents in the Master Disk. This activity is illustrated in FIG. 3 with the data flow indicated by the arrow labeled with a circle-2. As a consequence of this activity, the Local Disks get out of sync with the Master Disk. It is therefore necessary to update the Local Disks. The procedure is called a Mirror-Update. FIG. 2 outlines the general steps of the process.

The synchronization can be triggered by a content administrator, or in accordance with a schedule, or based on other scheduling criteria. When an update is desired, the procedure of Mirror-Update starts (step 020201) and proceeds as follows:

Step 020202—The Authoring Server stops creating and updating contents in Master Disk.

Step 020203—The contents that the Authoring Server has cached in its memory are written to the Master Disk and then flushed.

Step 020204—The Authoring Server sends a ResyncMSG to the Disk Controller, along with the indication that Local Disk[DN] is to be synchronized. This is shown in FIG. 3 by the line labeled with circle-3. This message causes the Disk Controller to copy updated disk blocks in the Master Disk to Local Disk[DN]. Note that none of the Web Server machines has Local Disk[DN] mounted.

Step 020205—The Authoring Server then enters a wait state, pausing until it receives a CompleteMSG from the Disk controller.

Step 060108—The ResyncMSG is sent to Disk Controller (FIG. 6).

Step 060103 (circle-4 in FIG. 3)—Referring to FIG. 6, the Disk Controller receives the ResyncMSG. Processing continues with RESYNC INIT (step 020101, FIG. 2). The Disk Controller receives DN from the ResyncMSG sent by Authoring Server. This instructs the Disk Controller to copy updated disk blocks from the Master Disk to Local Disk[DN]. If a previous Resync daemon is processing, the Mirror-Update procedure can wait until the prior Resync daemon finishes or Disk Controller can inform the Authoring Server and the Authoring Server can try again later. These are design choices.

Step 020102—For all x, BM2[DN][x] is a logical OR between BM2[DN][x] and BM1[DN][x].

Step 020103—For all x, BM1[DN][x] is set 0.

Step 020104—The Disk Controller sends CompleteMSG to the Authoring Server.

Step 020105—The Disk Controller initiates a Resync daemon (Resyncd) to update Local Disk[DN] with the new contents in the Master Disk. Hence, processing proceeds to RESYNCD START (step 050101, FIG. 5). The procedure of Resyncd is described later in connection with FIG. 5.

Step 020106—Eventually, the Resync daemon completes. After this, the Disk Controller waits for a message, again (step 060108, FIG. 6).

Step 020205—Recall that the Authoring Server is waiting for a CompleteMSG from the Disk Controller. Upon receiving it, the Authoring Sever proceeds to Step 020206.

Step 020206 (circle-2 in FIG. 3)—In accordance with the invention, the Authoring Server starts creating and updating contents in Master Disk, even though the updating process has not yet finished. This approach is taken on the principle that the Authoring Server is not likely to modify the very blocks it had just updated. However, in the event that the Authoring Server wants to make a change to a block that has just been updated, the Write routine in FIG. 8 solves this problem.

Step 020207 (circle-5 in FIG. 3)—The Authoring Server sends ReMountMSG to all of the ReMount daemons on the Web Server machines, along with the DN indication. This message causes the Web Server machines to satisfy subsequently received client read requests from Local Disk[DN], which contains the latest information.

Step 020302—Each ReMount daemon receives the ReMountMSG from the Authoring Server.

Step 020303 (circle-6 in FIG. 3)—Each ReMount daemon mounts Local Disk[DN]. Set RootDN=DN. After this, the HTTP daemon reads data from Local Disk[DN].

Step 020304—If ReqN[(DN+1)mod 2]==0, each ReMount daemon can unmount Local Disk [(DN+1) mod 2]. If not, the ReMount daemon waits until ReqN [(DN+1)mod 2] will be 0. Here, DN represents the disk with was updated with the Master Disk, and (DN+1) mod 2 represents the non-updated disk.

Step 020305 (circle-7 in FIG. 3)—Each ReMount daemon unmounts Local Disk[(DN+1)mod 2].

Step 020306 (circle-8 in FIG. 3)—Each ReMount daemon sends CompleteMSG to the Authoring Server.

Step 020208—The Authoring Server waits until it receives a CompleteMSG from each of the Web Server machines.

Step 020209—When all of the Web Server machines have unmounted the non-updated disk, then DN can be updated. Hence, DN=(DN+1)mod 2.

Step 020210—The process of MIRROR UPDATE finishes.

Referring now to FIGS. 2 and 5, at step 020105, the Disk Controller runs the Resync daemon. This daemon process copies updated disk blocks from the Master Disk to the Local Disk identified by DN. The flowchart of FIG. 5 outlines the processing of the Resync daemon:

Step 050102—A temporary variable DBN is set to 1. Note that temporary variable x used in this procedure to indicate that the Resync daemon copies updated disk blocks from the Master Disk to the Local Disk[x]. The value of x is set to DN.

Step 050103—If DBN is larger than the maximum number of disk blocks, the Resync daemon finishes (step 050108).

Step 050104—If a disk block[DBN] in Master Disk is updated but not copied, then proceed to step 050105. If not, proceed to step 050107. Note BM2[x][DBN]==1 indicates that disk block[DBN] in the Master Disk has not yet been copied to the Local Disk.

Step 050105—Copy the disk block[DBN] in Master disk to a disk block[DBN] in Local Disk[x]. As can be seen a salient aspect of the present invention is the direct transfer of data from disk to disk. The transfer occurs along a data path within the storage device 010801 that is exclusive of the data switch 010601.

Step 050106—This process updates the disk block[DBN] of Local Disk[x]. Set BM2[x][DBN] to 0 to indicate that the block has been copied.

Step 050107—Increment to the next block, DBN=DBN+ 1. Repeat the above procedure for all disk blocks in the Master Disk.

Step 050108—The process of Resyncd finishes.

Referring now to FIG. 7, after the Resync daemon has begun, disk blocks in Local Disk[x] will not all be updated immediately. It takes a finite amount of time to copy the updated blocks from the Master Disk to the Local Disk. Meanwhile, if there is a read access to one of those disk blocks, the Disk Controller must give the requester the impression that the Local Disk has been fully updated. The Disk Controller must determine whether the Local Disk contains the updated information, and if not it must read the requested disk block not from the Local Disk[x] but from the Master Disk. The flowchart of FIG. 7 outlines a read procedure for this situation:

Step 070101—When the Disk Controller receives a ReadMSG, the procedure is called from step 060104. A temporary variable DBN and x indicate that a requestor is attempting to read a disk block[DBN] in Local Disk[x].

Step 070102—If ReadMSG indicates that the requestor tries to read data from Master Disk (as in the case of the Authoring Server), the Disk Controller simply proceeds to step 070108, since the Master Disk by definition contains the most current content. If the read request is for a Local Disk, then proceed to step 070103.

Step 070103—If disk block[DBN] in Local Disk[x] has already updated (i.e., BM2[x][DBN]=0), then proceed to step 070104. If not, proceed to step 070105.

Step 070104—The Disk Controller reads disk block [DBN] from the Local Disk[x] and sends this disk block to the requestor. READ procedure finishes (step 070109).

Step 070105—The Disk Controller read disk block[DBN] from the Master Disk and sends this disk block to the requestor.

Step 070106—The Disk Controller writes the disk block [DBN] that was read in step 070105 to the disk block [DBN] in the Local Disk[x]. This process updates the disk block[DBN] in Local Disk[x].

Step 070107—The disk block[DBN] in Local Disk[x] is now updated, so BM2[x][DBN] is set 0. READ procedure finishes (step 070109).

Step 070108—The Disk Controller reads disk block [DBN] from Master Disk and sends this disk block to the requestor. READ procedure finishes (step 070109).

The path comprising steps 070103, 070105, 070106, and 070107 constitute a critical path, the significance of which will be discussed below.

Referring now to FIG. 8, after the Resync daemon has begun, disk blocks in Local Disk[x] will not all be updated immediately. It takes a finite amount of time to copy the updated blocks from the Master Disk to the Local Disk. Meanwhile, the Authoring Server is proceeding with its next round of creation/updating activity (step 020206, FIG. 2). Consequently, it is possible that a write attempt will be made to a block in the Master Disk before it has been copied to the Local Disk. The flowchart in FIG. 8 outlines a procedure for dealing with this situation:

Step 080101—When the Disk Controller receives a WriteMSG, the procedure is called from Step 060105. A temporary variable DBN indicates that a requestor (namely, the Authoring Server) wants to write to disk block[DBN] in the Master Disk. Note that there is no write access to any Local Disks because Web Server machines only issue read requests to the Local Disks.

Step 080102—A temporary variable x is used for indexing the Local Disks. Set x=1.

Step 080103—If x>NDISK, then proceed to step 080109. If not, then proceed to step 080104. Here, NDISK is the number of Local Disks, namely 2.

Step 080104—If the disk block[DBN] in Local Disk[x] has not yet been updated (i.e., BM2[x][DBN]=1), that disk block must be updated before the corresponding disk block in the Master Disk is overwritten. Hence, proceed to step 080105. If the disk block[DBN] in Local Disk[x] has already been updated, proceed to Step 080107.

Step 080105—Disk Controller writes a disk block[DBN] in Master Disk to a disk block[DBN] in Local Disk[x].

Step 080106—Because the disk block[DBN] in Local Disk[x] was updated, BM2[x][DBN] is set to 0 to indicate this fact.

Step 080107—In Step 080109, Disk Controller will write the disk block[DBN] in Master Disk, thus updating this block. When Authoring Server sends a ResyncMSG (step 020204, FIG. 2), the Disk Controller must copy this disk block to all Local Disks. This is accomplished by setting BM1[x] [DBN] to 1 to indicate that block DBN contains new information.

Step 080108—Repeats the above processes (step 080103 to step 080108) for all Local Disks.

Step 080109—At last, the Disk Controller can proceed to process the WriteMSG. Disk Controller writes the disk block[DBN] in the Master Disk. The WRITE procedure finishes (Step 080110).

The steps comprising steps 080104, 080105, and 080106 constitute a critical path, the significance of which will be discussed below.

Figure 4:
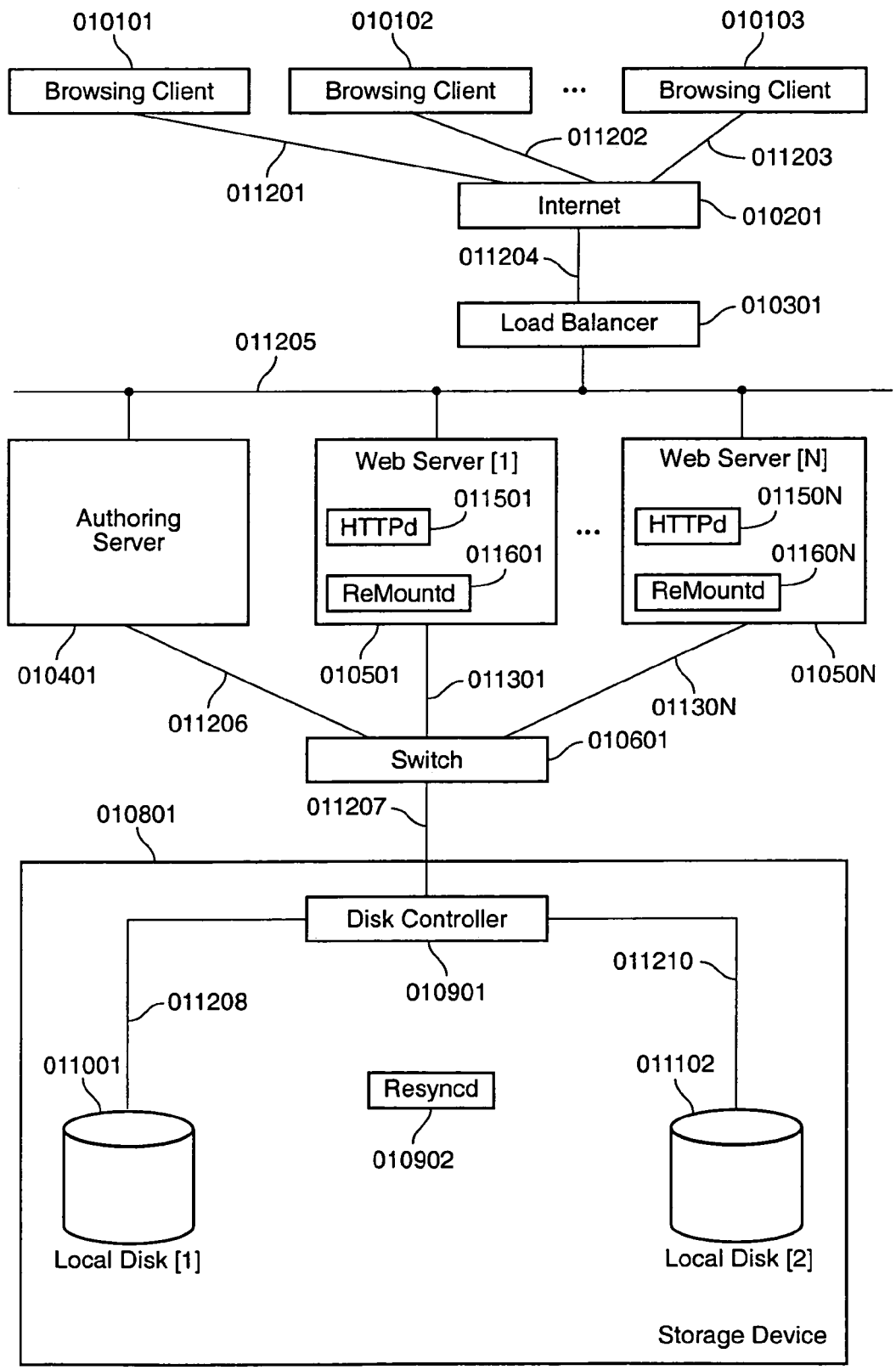
FIG. 4 is a schematic representation of another embodiment of a data server arrangement in accordance with the invention.

Refer now to the system diagram of FIG. 4 and the flowchart of FIG. 14 for a discussion on another embodiment of the invention. Here, the data storage system 010801 shown in FIG. 4 comprises two Local Disk units 011001, 011102. In this embodiment, there is no Master Disk. The Authoring Server creates and updates contents in one of the Local Disks. The other components are the same as shown in the embodiment of FIG. 2.

Referring for a moment to FIGS. 10, 11,18 and 19, various internal data variables are maintained by the foregoing components. The Authoring Server 010401 manages Unmounted Disk Number, DN 160101 (FIG. 13). This data variable indicates that Local Disk[DN] is not mounted by any Web Server machine.

Each Web Server machine 010501, . . . 01050N manages the disk number of its root directory, RootDN 110101 (FIG. 11). This variable indicates that each Web Server machine is reading contents from Local Disk[RootDN]. Each Web Server machine also manages the number of uncompleted requests for each Local Disks. For example, ReqN[1] 100101 (FIG. 10) indicates the number of uncompleted requests for Local Disk[1]. A Web Server machine can unmount Local Disk[i], if and only if ReqN[i] is zero.

Figure 18:
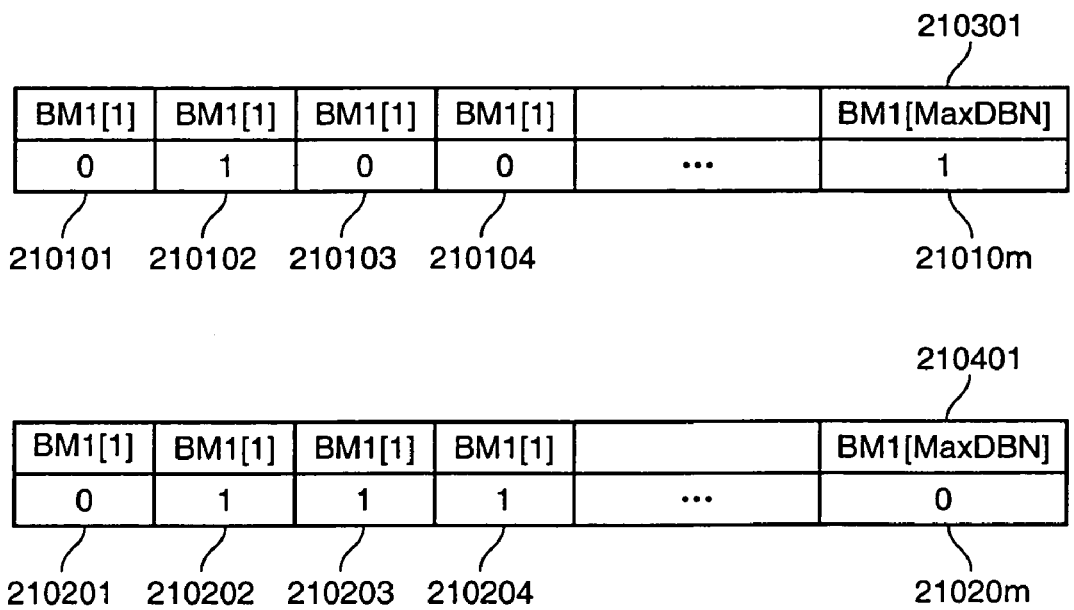
FIGS. 18 and 19 illustrate the data structures used in accordance with another embodiment of the invention.
Figure 19:
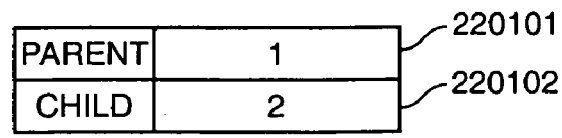
Figure 20:
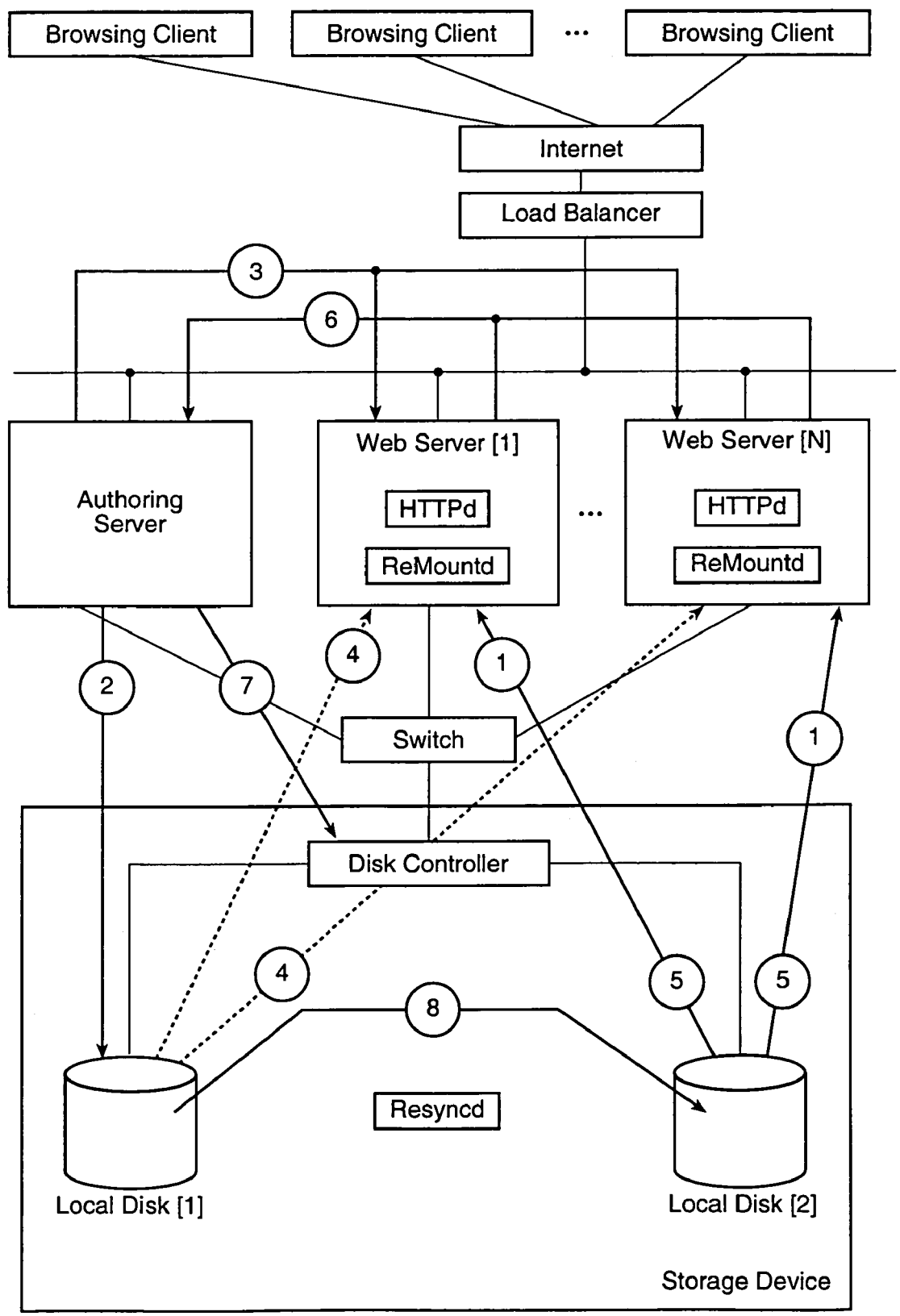
FIG. 20 illustrates the logical data flows before and during an update procedure in accordance with another embodiment of the invention.

Storage Device 010801 manages a set of bitmaps, BM1 [x] 210301 and BM2[x] 210401 (FIG. 18). MaxDBN is the maximum number of disk blocks of a Local Disk. In this invention, all disk drives have same number of disk blocks. Variables PARENT 220101 and CHILD 220102 (FIG. 19) are also provided. The variables PARENT and CHILD store Local Disk number 1 or 2. By convention, local Disk [PARENT] has more up-to-date contents than Local Disk [CHILD]. Consequently, the Resync daemon copies updated disk blocks from Local Disk[PARENT] to Local Disk [CHILD].

Referring to FIGS. 6, 9, 14–17, and 20, at system boot up, each Web Server machine 010501, . . . 01050N mounts Local Disk[2] as its root directory. The value of RootDN is 2, so web servers read contents from Local Disk[2]. Each Web server also initializes ReqN[1]=0 and ReqN[2]=0. Each Web Server machine starts its own HTTP daemon (step 090101, FIG. 9) and ReMount daemon (step 170301, FIG. 14). The HTTP daemon process client requests from Browsing Clients. The ReMount daemon waits for a ReMountMSG from the Authoring Server (step 170302).

The Authoring Server initializes DN to 1 to indicate that Local Disk[1] is not mounted by any of the Web Server machines. At system boot up, Local Disk[1] and Local Disk[2] contain the same contents. Also at system boot up, the Disk Controller begins to work in the manner described above in connection with FIG. 6. In this embodiment of the invention, the Disk Controller also initializes for all x, BM1[x] and BM2[x] are set to 0.

In this embodiment of the invention, the processing in the Disk Controller (FIG. 6) and the HTTP daemon (FIG. 9) are same as previously discussed.

Referring to FIG. 14, a flow chart of the update process in accordance with this embodiment of the invention is shown:

Step 170202—The Authoring Server stops creating and updating contents in the Local Disk[DN].

Step 170203—Any data that the Authoring Server has cached in memory is flushed to the Local Disk[DN].

Step 170204 (circle-3 in FIG. 20)—The Authoring Server sends a ReMountMSG to all of the ReMount daemons on the Web Server machines. This message causes the Web Server machines to read contents from Local Disk[DN] to satisfy subsequent client requests for data.

Step 170302—Each ReMount daemon receives the ReMountMSG from the Authoring Server.

Step 170303 (circle-4 in FIG. 20)—Each ReMount daemon mounts Local Disk[DN] as its root directory. RootDN=DN. From this point on, client requests for data will be satisfied with data read from Local Disk[DN].

Step 170304—If ReqN[(DN+1)mod 2]==0, each ReMount daemon can unmount Local Disk [(DN+1)mod 2]. If not, the ReMount daemon waits until ReqN[(DN+1)mod 2] will be 0.

Step 170305 (circle-5 in FIG. 20)—Each ReMount daemon unmounts Local Disk[(DN+1)mod 2].

Step 170306 (circle-6 in FIG. 20)—Each ReMount daemon sends a CompleteMSG to the Authoring Server when it has successfully unmounted the previous disk (i.e., (DN+1)mod 2).

Step 170205—The Authoring Server waits for CompleteMSG from all of the Web Server machines, at which point the previous disk is no longer mounted by any Web Server machine.

Step 170206 (circle-7 in FIG. 20)—The Authoring Server sends a ResyncMSG to the Disk Controller. This message causes the Disk Controller to copy updated disk blocks from Local Disk[DN] to Local Disk [(DN+1)mod 2]. Note that Local Disk[(DN+1)mod 2] is not mounted on any of the Web Server machines at this time.

Step 060108—A ResyncMSG is sent to the Disk Controller.

Step 060103 (circle-8 in FIG. 20)—The Disk Controller receives the ResyncMSG and proceeds to RESYNC INIT (step 170101, FIG. 14). At this time, the Disk Controller receives DN from the ResyncMSG sent by Authoring Server. This indicates that the Disk Controller is to copy updated disk blocks in Local Disk[DN] to Local Disk[(DN+1)mod 2].

Step 170102—If a previous Resync daemon is processing, the Mirror-Update procedure waits until the prior Resync daemon finishes.

Step 170103—From the definition of the variables PARENT and CHILD, PARENT=DN.

Step 170104—CHILD=(DN+1)mod 2.

Step 170105—For all x, BM2[x]=BM1[x].

Step 170106—For all x, BM1[x]=0.

Step 170107—Disk Controller sends a CompleteMSG to the Authoring Server.

Figure 15:
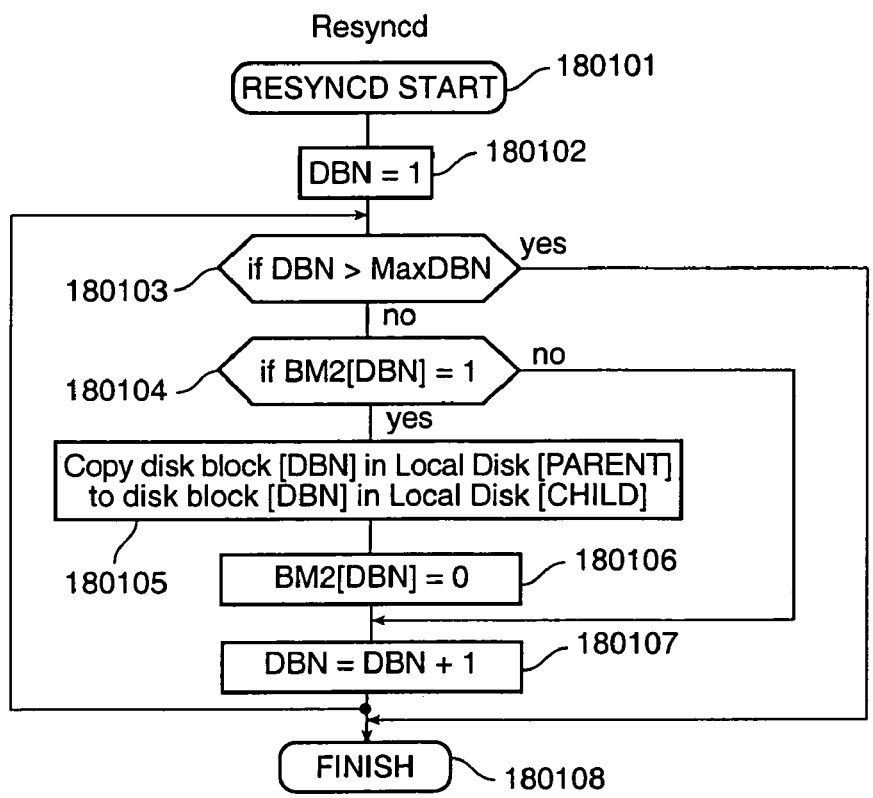
FIG. 15 outlines the main processing step of the Resync daemon process in accordance with another embodiment of the invention.

Step 170108—Disk Controller runs Resync daemon (RESYNCD START at step 180101, and FIG. 15). This daemon process is the process that actually performs the copy operations to effectuate the update.

Step 170109—The procedure of RESYNC INIT finishes. The Disk Controller then waits for another message (FIG. 6).

Step 170207—The Authoring Server waits for a CompleteMSG from the Disk Controller. Upon receiving it, the Authoring Server proceeds to step 170208.

Step 170208—The Authoring Server begins the next round of creation and/or updating activity in Local Disk [(DN+1)mod 2]. Notice that at this point, the Resync daemon process is in the process of performing the update.

Step 170209—Since all Web Server machines have already unmounted Local Disk [(DN+1)mod 2], DN is updated; DN=(DN+1)mod 2.

Step 170210—The process of MIRROR UPDATE finishes.

Refer now to FIG. 15 for a discussion of the Resync daemon in this embodiment of the invention. Recall that at Step 170108, the Disk Controller runs the Resync daemon process. This daemon process copies updated disk blocks in Local Disk[PARENT] to Local Disk[CHILD]. Following a flowchart outlining this procedure:

Step 180102—A temporary variable DBN is set to 1.

Step 180103—If DBN is larger than the maximum number of disk blocks (MaxDBN), then the Resync daemon finishes (step 180108).

Step 180104—If a disk block[DBN] in Local Disk [CHILD] is updated, processing continues at step 180105. If not, processing continues at step 180107. BM2[DBN]==1 indicates that a disk block[DBN] in Local Disk[PARENT] is updated.

Step 180105—Copy the disk block[DBN] in Local Disk [PARENT] to a disk block[DBN] in Local Disk [CHILD]. As in the other embodiment, the disk to disk transfer occurs entirely within the storage device 010801, along a data path exclusive of the data switch.

Step 180106—By Step 180105, the disk block[DBN] of Local Disk[CHILD] is updated. BM2[DBN] is set 0 to indicate this fact.

Step 180107—DBN=DBN+1. Repeats the above procedure for all disk blocks in Master Disk.

Step 180108—The Resync daemon process finishes.

The steps comprising steps 180104, 180105, and 180106 constitute a critical path, the significance of which will be discussed below.

Figure 16:
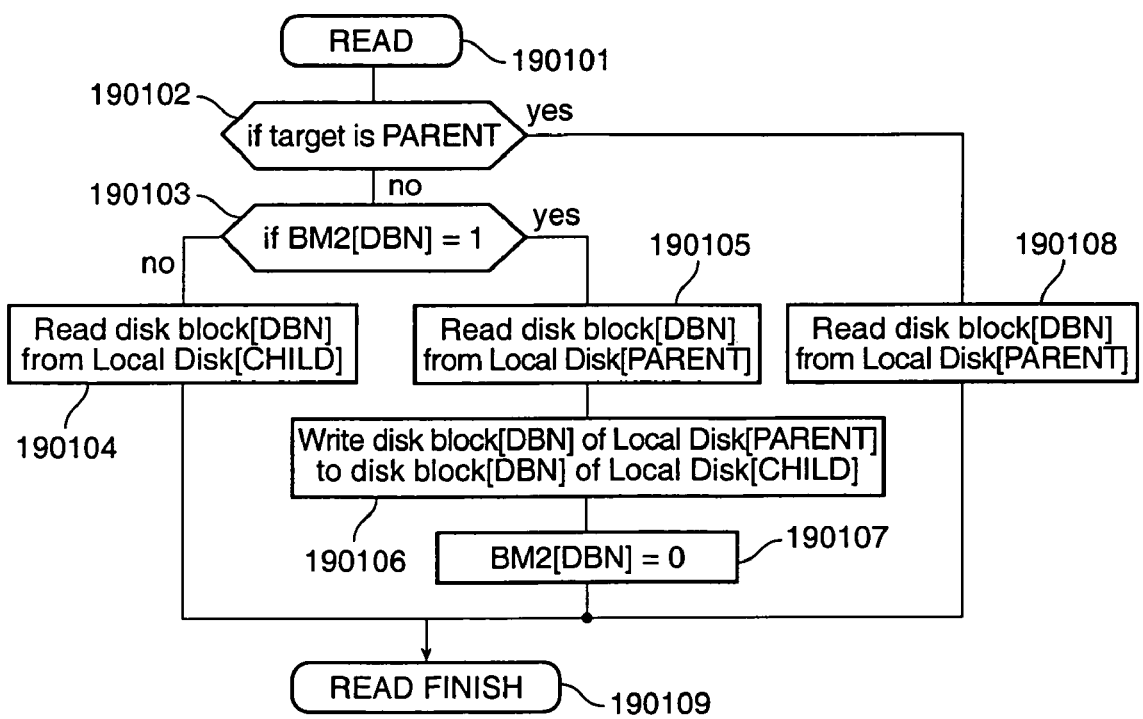
FIG. 16 outlines the main processing steps of the Read procedure in accordance with another embodiment of the invention.

Referring to FIG. 16, after the Resync daemon begins, a finite amount of time is needed to complete the update operation. However, read requests are being made. Consequently, some read operations on disk blocks in Local Disk[CHILD] will not contain the updated information since not all blocks will necessarily have been updated. If there is a read access to one of those disk blocks, the Disk Controller must read that disk block not from Local Disk[CHILD] but from Local Disk[PARENT]. FIG. 16 outlines a read procedure for this scenario:

Step 190101—When the Disk Controller receives a ReadMSG, the procedure is called from Step 060104 (FIG. 6). A temporary variable DBN indicates that the requester has specified a read operation to a disk block[DBN] in one of the Local Disks.

Step 190102—If the ReadMSG indicates that the read request is to read data from Local Disk [PARENT], then Disk Controller does not need to do anything, since the PARENT by definition contains the most current information. Processing therefore continues at step 190108. If the read request is to the CHILD, then processing continues at step 190103.

Step 190103—If disk block[DBN] in Local Disk[CHILD] has already updated, processing continues at step 070104. If not, continues at step 070105.

Step 190104—The Disk Controller reads a disk block [DBN] in Local Disk[CHILD] and sends this disk block to the requestor. The READ procedure finishes (step 190109).

Step 190105—The Disk Controller reads a disk block [DBN] in Local Disk[PARENT] and sends this disk block to the requestor.

Step 190106—The Disk Controller also writes this disk block to the Local Disk[CHILD]. This updates the disk block[DBN] in Local Disk[CHILD].

Step 190107—The disk block[DBN] in Local Disk [CHILD] is now updated, so BM2[DBN] is set to 0 to indicate this fact. The READ procedure finishes (step 190109).

Step 190108—The Disk Controller reads a disk block [DBN] in Local Disk[PARENT] and sends this disk block to the requestor. The READ procedure finishes (step 190109).

The path comprising steps 190103, 190105, 190106, and 190107 constitute a critical path, the significance of which will be discussed below.

Figure 17:
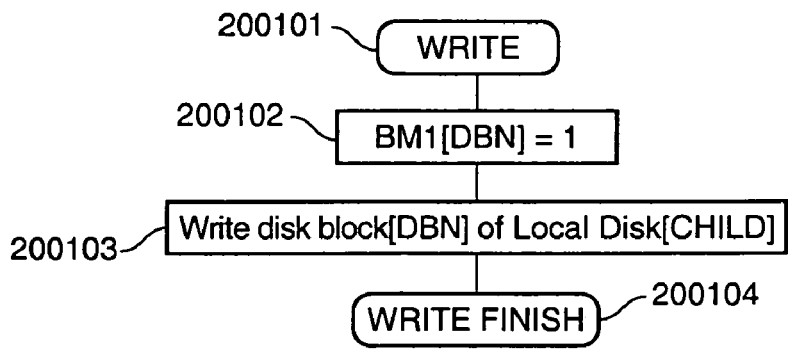
FIG. 17 outlines the main processing steps of the Write procedure in accordance with another embodiment of the invention.

Referring now to FIG. 17, a description of WRITE processing in accordance with this embodiment of the invention is given:

Step 200101—When the Disk Controller receives a WriteMSG, the procedure is called from Step 060105 (FIG. 6). A temporary variable DBN indicates that a requester tries to write a disk block[DBN] in Local Disk[CHILD]. Note that there is no write access to Local Disk[PARENT] by any of the Web Server machines. At this point, the Web Server machines only read contents from Local Disk[PARENT].

Step 200102—In Step 080109, the Disk Controller will write the disk block[DBN] in Local Disk[CHILD]. When the Authoring Server sends a ResyncMSG, the Disk Controller must know to copy this disk block to Local Disk[PARENT]. This fact is retained by setting BM1[DBN] to 1.

Step 200103—The Disk Controller processes the WriteMSG by writing the disk block[DBN] in Local Disk[CHILD]. WRITE procedure finishes (step 200104).

It is noted that if the size of data specified by WriteMSG is smaller than the size of a disk block, then prior to step 200103, we must copy a disk block[DBN] in Local Disk [PARENT] to Local Disk[CHILD] when BM2[DBN]=1. The reason for doing this best explained by using an example. At system boot up, the disk block[DBN] in Local Disk[1] and the disk block[DBN] in Local Disk[2] have the same data. At some point, the disk block[DBN] in Local Disk[2] is entirely updated. Eventually, Authoring Server issues a Resync-MSG indicating that the disk block[DBN] in Local Disk[2] must be copied to Local Disk[1]. Authoring Server can update part of the disk block[DBN] in Local Disk[1] before finishing the copy. If BM2[DBN] is set to 0 before finishing the copy, another part of the disk block [DBN] in Local Disk[2] may not be copied to Local Disk[1]. As the result, an inconsistency between Local Disk[1] and Local Disk[2] will arise.

At least, some locking mechanism is needed when Resyncd is processing some copy operation and Disk Controller is in the critical paths, identified above. The critical paths must be serialized with each other. Two or more critical paths can not be executed at the same time. This is because the bitmaps BM1 and BM2 are shared resources for Resyncd and for Disk Controller.

Figure 21:
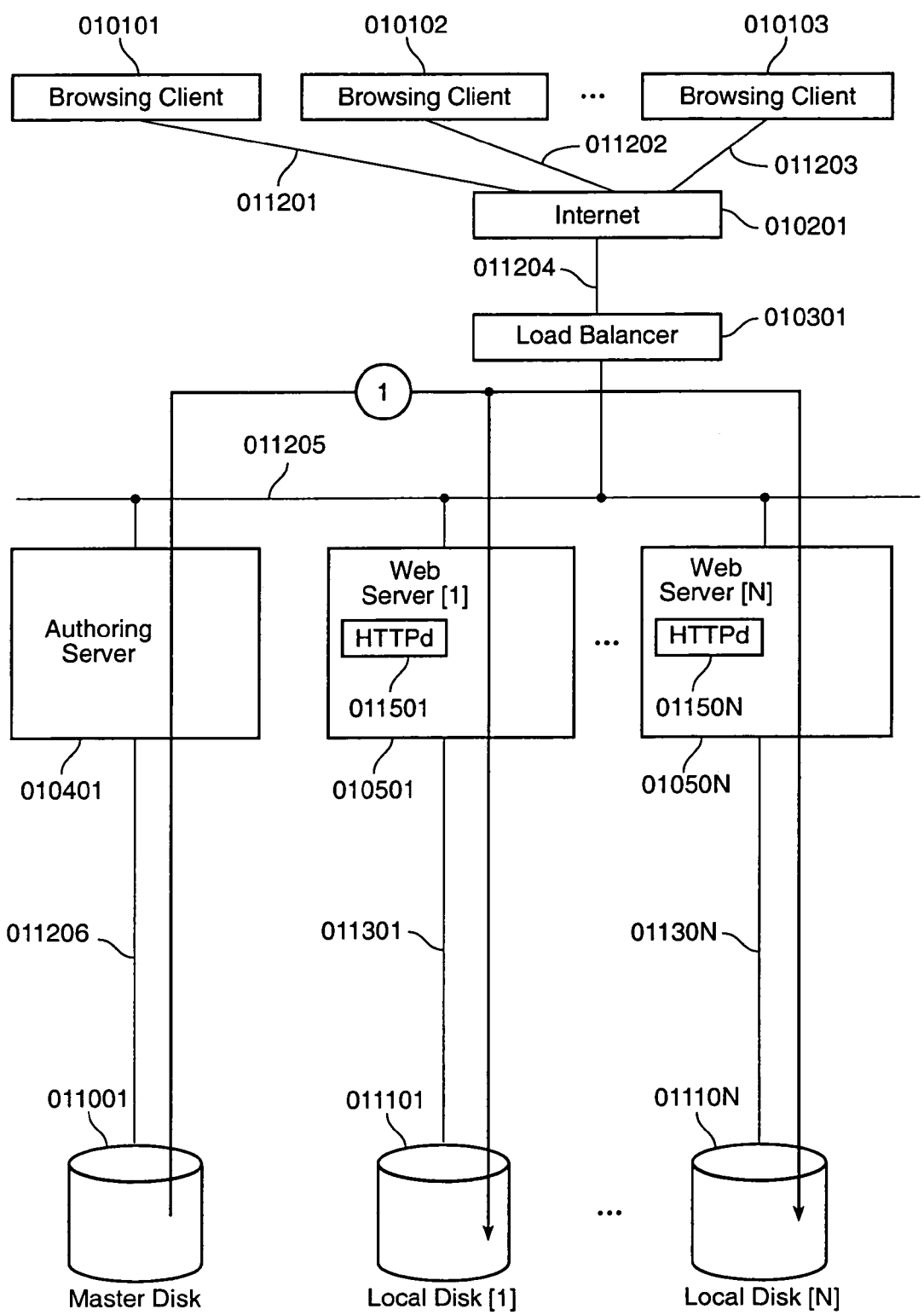
FIG. 21 shows a prior art arrangement of an updating arrangement in a data server system.

FIG. 21 shows a traditional WWW environment. Each Web Server machine has its own local disk. To perform a Mirror-Update operation, the Authoring Server must read the contents from the Master Disk and send them to each Web Server machine. Each Web Server machine responds by storing the received contents in its local disk, as indicated by the heavy line labeled with circle-1 in the figure. Such processing consumes valuable CPU resources; resources which are better used to satisfy client requests for data. Consequently, it is not practical to perform live updates where large amounts of data must be updated. For example, in a video-on-demand system, the system must be taken down to install or de-install video releases. This is a restriction of the traditional method.

On the other hand, the method and system in accordance with the present invention do not need consume the CPU power of web servers. The Storage Device is the only component which copies data from the Master Disk to the Local Disk. The only task required of the Web Server machine is to mount and unmount disks during the update process.

Compared with a shared file system approach, the overhead of the file server when accessing a file is reduced in this invention because each Web Server machine can access a file without any communication overhead. Furthermore, the use of the data switch avoids the bottleneck of the file server.

What is claimed is:

1. In a content server system for servicing client requests for content, including a plurality of Web servers connected to a plurality of clients and a storage device connected to the Web servers, a method of updating data thereof comprising:
   providing a master disk storage component for updating data in response to write requests from an authorization server and first and second local disk storage components for retrieving data in response to read requests from the plurality of Web servers, the first and second local disk storage components and master disk component being hard disk drives in the storage device, data stored on the first and second local disk storage components and master disk component initially being synchronized so as to be mirror images of each other;
   mounting the first local disk storage component to the plurality of Web servers, the plurality of Web servers operable to mount only one of the first and second local disk storage components at any time;
   reading out data from the mounted first disk storage component in response to client read requests from the plurality of Web servers;
   performing a first update of data in the master disk storage component in response to a write request from the authorization server, all write requests from the authorization server updating data in the master disk storage component;
   receiving a synchronization signal;
   in response to receiving the synchronization signal, copying data from the master disk storage component to the unmounted second local disk storage component in order to synchronize data between the master disk storage component, including updates from the authorization server, and the unmounted second local disk storage component, wherein the unmounted second local disk storage component becomes a mirror image of the master disk storage component;

in response to the unmounted second local disk storage component becoming a mirror image of the master disk storage component including updates from the authorization server, mounting the second local disk storage component to the plurality of Web servers and unmounting the first local disk storage component; and reading out data from the mounted second local disk storage component in response to subsequently received client read requests from the plurality of Web servers.

2. The method of claim 1 wherein the step of reading out data from the first local disk storage component includes transmitting the data through a data switch.

3. The method of claim 2 wherein the step of copying includes transferring data over a data path exclusive of the data switch.

4. The method of claim 2 wherein the step of reading out data from the second local disk storage component includes transmitting the data through the data switch.

5. The method of claim 4 wherein the first step of updating includes transferring data through the data switch.

6. The method of claim 1 wherein some of the data in the first local disk storage component is contained in a cache memory and the step of reading out data includes reading out data from the cache memory.

7. The method of claim 6 further including unmounting the first local disk storage component and flushing the cache memory.

8. In a data server having a storage system for servicing client requests, a method for updating data contained in the storage system without interrupting service to clients, comprising:

providing a master data store for updating data in response to write requests and a first local data store and a second local data store for retrieving data in response to read requests, the master data store, first local data store, and second local data store initially being synchronized so as to be mirror images of each other;

mounting the first local data store to the storage system, the data storage system operable to mount only one of the first and second local data stores at any time;

(i) reading out data from the storage system via a data switch, the data being obtained from the mounted first local data store in the storage system, the first local data store being a first hard disk drive;

(ii) writing updated data to the master data store in the storage system via the data switch, the master data store being a second hard disk drive;

(iii) producing a first synchronization signal;

(iv) in response to the first synchronization signal, copying data from the master data store to the unmounted second local data store in the storage system to produce a mirror image of the data on the master data store on the unmounted second local data store, the second local data store being a third hard disk drive, mounting the second local data store to the data storage system in response to the unmounted second local data store becoming a mirror image of the master data store, and unmounting the first local data store;

(v) producing a second signal; and (vi) in response to the second signal, reading data from the storage system via the data switch, the data being obtained either from the master data store or from the mounted second local data store.

9. The method of claim 8 wherein step (iv) occurs concurrently with step (vi).

10. The method of claim 8 wherein in step (iv) the data is written over a data path exclusive of the data switch.

11. The method of claim 8 further including a step (vii) of writing to an area on the master data store concurrently with step (iv).

12. The method of claim 11 wherein the step (vii) includes determining whether the area on the master data store to be written first needs to be written to the second local data store.

13. A content server system for providing content data to clients in response to read requests, comprising:

a storage system including a master data store and first and second local data stores, each data store being a hard disk drive, the data stored on the first and second local data stores and master data store being initially synchronized so as to be mirror images of each other, the master data store being provided for updating data in response to write requests and first local data store and a second local data store for retrieving data in response to read requests;

a data switch in data communication with the storage system;

a first data server in communication with the data switch and configurable to read data from a mounted first local data stores where the first data server is operable to mount only one of the first and second local data stores at any time; and reading out data from the mounted first local data store in response to client requests;

an authoring server in data communication with the data switch for updating data on the master data store, wherein the storage system is configured to transfer at least some of the contents of the master data store to the unmounted second local data stores in response to receiving a first synchronization signal from the authoring server, wherein a mirror image of data stored on the master data store is produced in the unmounted one of the first and second local data stores, in response to the unmounted second local data store becoming a mirror image of the master of the master data store, the first data server is operable to mount the previously unmounted second local data store and unmount the first local data store, and read data from the previously unmounted second data store in response to receiving a second signal from the authoring server, and wherein the authoring server produces updated data on the master data store and causes the updated data to be transferred directly to the unmounted first local data stores while the first data server provides data from the mounted second local data stores, thereby allowing update of data by the authoring server without interrupting data service to the clients.

14. The system of claim 13 wherein the storage system is further configured to transfer at least some of the contents of the master data store to the unmounted one of the first and second local data stores along a data path exclusive of the data switch.

15. The system of claim 13 wherein the storage system is further configured to detect the second signal and in response thereto to determine whether to provide data from the second local data store or from the master data store when the first server reads data from the second local data store.

16. The system of claim 13 wherein the data switch is a fibre channel switch.

* * * * *